(12) United States Patent
Wu (10) Patent No.: US 10,534,181 B2
(45) Date of Patent: Jan. 14, 2020

(54) OPTICAL WAVEGUIDE AND MANUFACTURING METHOD THEREOF, AUGMENTED REALITY DEVICE

(71) Applicant: BOE TECHNOLOGY GROUP CO., LTD., Beijing (CN)

(72) Inventor: Naifu Wu, Beijing (CN)

(73) Assignee: BOE TECHNOLOGY GROUP CO., LTD., Beijing (CN)

( * ) Notice: Subject to any disclaimer, the term of this patent is extended or adjusted under 35 U.S.C. 154(b) by 0 days.

(21) Appl. No.: 15/996,694

(22) Filed: Jun. 4, 2018

(65) Prior Publication Data
US 2019/0041645 A1     Feb. 7, 2019

(30) Foreign Application Priority Data

Aug. 1, 2017  (CN) .......................... 2017 1 0648399

(51) Int. Cl.
*G02B 27/01*     (2006.01)
*G02B 27/14*     (2006.01)
(Continued)

(52) U.S. Cl.
CPC ......... *G02B 27/0172* (2013.01); *G02B 6/132* (2013.01); *G02B 27/0176* (2013.01);
(Continued)

(58) Field of Classification Search
CPC ...... G02B 5/18; G02B 5/1814; G02B 5/1819; G02B 5/1861; G02B 27/01;
(Continued)

(56) References Cited

U.S. PATENT DOCUMENTS 8,384,999 B1 *  2/2013  Crosby ............. G02B 27/0172
                                                            349/11
9,422,291 B2 *  8/2016  Niazi .................... A61K 31/519
(Continued)

FOREIGN PATENT DOCUMENTS

CN         101013177 A      8/2007
CN         104656258 A      5/2015
(Continued)

OTHER PUBLICATIONS

First Office Action for Chinese Patent Application No. 201710648399.8 dated Jan. 18, 2019.

*Primary Examiner* — William C. Dowling
(74) *Attorney, Agent, or Firm* — Calfee, Halter & Griswold LLP (57) ABSTRACT

An optical waveguide, which includes a medium layer and N semi-transmissive, semi-reflective films supported by the medium layer. The semi-transmissive, semi-reflective films are arranged in sequence along a first direction perpendicular to a thickness direction of the medium layer. The orthographic projections of two adjacent semi-transmissive, semi-reflective films on a plane parallel to the thickness direction of the medium layer have an overlap region. A contour of each semi-transmissive, semi-reflective film is a curved surface structure, curved surface structures of the N semi-transmissive, semi-reflective films are N continuous sub-curved surfaces formed by segmenting a same curved surface respectively, a sum of heights of the N sub-curved surfaces is a height of the curved surface, and a concave side of the curved surface structure of each semi-transmissive, semi-reflective film faces towards a same bottom surface of the medium layer.

12 Claims, 5 Drawing Sheets

(51) Int. Cl.
*G02B 27/28* (2006.01)
*G02B 6/132* (2006.01)

(52) U.S. Cl.
CPC ......... *G02B 27/145* (2013.01); *G02B 27/285* (2013.01); *G02B 2027/0125* (2013.01); *G02B 2027/0152* (2013.01)

(58) Field of Classification Search
CPC ............ G02B 27/0101; G02B 27/0172; G02B 27/0176; G02B 27/285; G02B 27/105; G02B 27/0125; G02B 27/0152
See application file for complete search history.

(56) References Cited

U.S. PATENT DOCUMENTS

| | | |
|---|---|---|
| 9,442,291 B1 | 9/2016 | Martinez et al. |
| 9,632,312 B1* | 4/2017 | Cakmakci ............ G02B 5/1852 |
| 2005/0180687 A1 | 8/2005 | Amitai |
| 2013/0229712 A1* | 9/2013 | Kress ................. G02B 27/0172 |
| | | 359/572 |
| 2014/0211146 A1 | 7/2014 | Gupta et al. |

FOREIGN PATENT DOCUMENTS

| | | |
|---|---|---|
| CN | 104956253 A | 9/2015 |
| CN | 105572876 A | 5/2016 |

\* cited by examiner (PRIOR ART)

OPTICAL WAVEGUIDE AND MANUFACTURING METHOD THEREOF, AUGMENTED REALITY DEVICE

CROSS REFERENCE OF RELATED APPLICATION

The present application claims priority to Patent Application No. 201710648399.8 filed in the Chinese Patent Office on Aug. 1, 2017, the disclosure of which is incorporated herein by reference.

TECHNICAL FIELD

This disclosure relates to the field of augmented reality (AR) technology, particularly to an optical waveguide and a manufacturing method thereof, as well as an augmented reality device.

BACKGROUND

Augmented reality technology is a new technology that combines real world information and virtual world information "seamlessly." Specifically, it simulates and superimposes entity information (visual information, sound, taste, sense of touch etc.), which is hard to be experienced within certain temporal and spatial ranges of the real world, and applies virtual information to the real world, so as to be perceived by a human, thereby achieving a transcendental sense experience. Augmented reality technology not only exhibits information of the real world, but also presents virtual information simultaneously. The two kinds of information are mutually complementary.

SUMMARY

Embodiments of this disclosure provide an optical waveguide with a reduced thickness and a manufacturing method thereof, as well as an augmented reality device in which the thickness of the optical waveguide is reduced.

An embodiment of the disclosure provides an optical waveguide, comprising a medium layer and N semi-transmissive, semi-reflective films supported by the medium layer, the N semi-transmissive, semi-reflective films being arranged in sequence along a first direction perpendicular to a thickness direction of the medium layer. Orthographic projections of every two adjacent semi-transmissive, semi-reflective films on a plane parallel to the thickness direction have an overlap portion. A contour of each of the semi-transmissive, semi-reflective films is a curved surface structure, wherein the curved surface structures of the N semi-transmissive, semi-reflective films arranged in sequence are N continuous sub-curved surfaces formed by segmenting a same curved surface respectively, a sum of heights of the N sub-curved surfaces is a height of the curved surface, and a concave side of the curved surface structure of each of the semi-transmissive, semi-reflective films faces towards a same bottom surface of the medium layer. N is a positive integer greater than or equal to 2.

In some embodiments, the N semi-transmissive, semi-reflective films have a same height, lower edges of the N semi-transmissive, semi-reflective films are located in a same plane.

In some embodiments, the medium layer comprises a plurality of strip-shaped sub-medium layers, the plurality of sub-medium layers are spliced in sequence along a width direction thereof, in two splicing surfaces of two adjacent sub-medium layers to be mutually spliced, one is a concave surface, the other is a convex surface, each semi-transmissive and each semi-reflective film is sandwiched between the two splicing surfaces of two adjacent sub-medium layers to be mutually spliced, the two splicing surfaces are fitted with the semi-transmissive, semi-reflective film.

In some embodiments, the medium layer comprises N bended sub-surfaces for supporting the N semi-transmissive, semi-reflective films respectively, the N bended sub-surfaces are arranged along a length direction of the medium layer.

In some embodiments, the N semi-transmissive, semi-reflective films have a same height, the plurality of sub-medium layers have a same thickness, the thickness of each sub-medium layer is equal to the height of each semi-transmissive, semi-reflective film.

In some embodiments, each of the semi-transmissive, semi-reflective films is substantially in a straight strip shape.

In some embodiments, the curved surface which is segmented to obtain the N continuous sub-curved surfaces is a free curved surface.

A further embodiment of the disclosure provides an augmented reality device, comprising the optical waveguide according to any one of the above embodiments and an image display apparatus, the image display apparatus being configured to project a displayed image onto the optical waveguide, the optical waveguide being configured to reflect light emitted from the image display apparatus to human eyes.

In some embodiments, orthographic projections of the N semi-transmissive, semi-reflective films on the bottom surface of the medium layer do not overlap, an extension line of a connecting line of a luminous point of the image display apparatus and a lower edge of any semi-transmissive, semi-reflective film does not intersect with an adjacent semi-transmissive, semi-reflective film or exactly goes through an upper edge of the adjacent semi-transmissive, semi-reflective film.

In some embodiments, orthographic projections of the N semi-transmissive, semi-reflective films on the bottom surface of the medium layer have an overlap region, light emitted from the image display apparatus is polarized light, each of the semi-transmissive, semi-reflective films is a polarization splitting dielectric film, the polarization splitting dielectric film being configured to enable the polarized light impinging thereon to be totally reflected.

In some embodiments, the image display apparatus is a liquid crystal display device.

A further embodiment of the disclosure provides a method for manufacturing an optical waveguide, comprising: forming a plurality of sub-medium layers, each of the sub-medium layers having a splicing surface, the splicing surface being a concave surface or a convex surface, and splicing the plurality of sub-medium layers together via the splicing surface so as to form a medium layer. The method further comprises: prior to splicing the plurality of sub-medium layers together, forming, on at least one of two splicing surfaces of two adjacent sub-medium layers to be spliced in the plurality of sub-medium layers, a semi-transmissive, semi-reflective film that covers the splicing surface, so as to form a plurality of semi-transmissive, semi-reflective films arranged in sequence, each semi-transmissive, semi-reflective film being sandwiched between two splicing surfaces of two adjacent sub-medium layers. Moreover, a contour of each of the semi-transmissive, semi-reflective films is a curved surface structure, and curved surface structures of the plurality of semi-transmissive, semi-reflective films arranged in sequence are a plurality of continuous sub-curved surfaces formed by segmenting a same curved surface respectively, a sum of heights of the plurality of sub-curved surfaces is a height of the curved surface, and a concave side of the curved surface structure of each of the semi-transmissive, semi-reflective films faces towards a same bottom surface of the medium layer.

BRIEF DESCRIPTION OF THE DRAWINGS

In order to explain the technical solutions of the embodiments of this disclosure more clearly, next, the drawings to be used in describing or explaining these embodiments will be introduced briefly. The drawings described below are only some embodiments of this disclosure. For the ordinary skilled person in the art, other drawings can also be obtained based on these drawings without inventive efforts.

FIG. 2($a$) is a schematic view of an optical waveguide provided by an embodiment of this disclosure;

FIG. 2($b$) is a schematic view of a medium layer of the optical waveguide of FIG. 2($a$).

FIG. 2($c$) is a schematic view of an optical waveguide provided by another embodiment of this disclosure;

FIG. 3($a$) is a schematic view of an optical waveguide provided by another embodiment of this disclosure;

FIG. 3($b$) is a schematic view of a medium layer of the optical waveguide of FIG. 3($a$).

FIG. 5($a$) is a schematic top view of an optical waveguide provided by an embodiment of this disclosure;

FIG. 5($b$) is a schematic top view of an optical waveguide provided by another embodiment of this disclosure;

REFERENCE SIGNS

01—optical waveguide; 02—image display apparatus; 10—medium layer; 101—sub-medium layer; 20—curved surface (free curved surface); 201—sub-curved surface; 30 (301, 302)—semi-transmissive, semi-reflective film; 40—segmenting line.

DETAILED DESCRIPTION OF EMBODIMENTS

The technical solutions in embodiments of this disclosure are described clearly and completely below in conjunction with the drawings. The embodiments described are only a part of rather than all of the embodiments of the invention. All other embodiments obtained by a person of ordinary skill in the art based on the embodiments in the disclosure fall within the scope of the invention.

Figure 1:
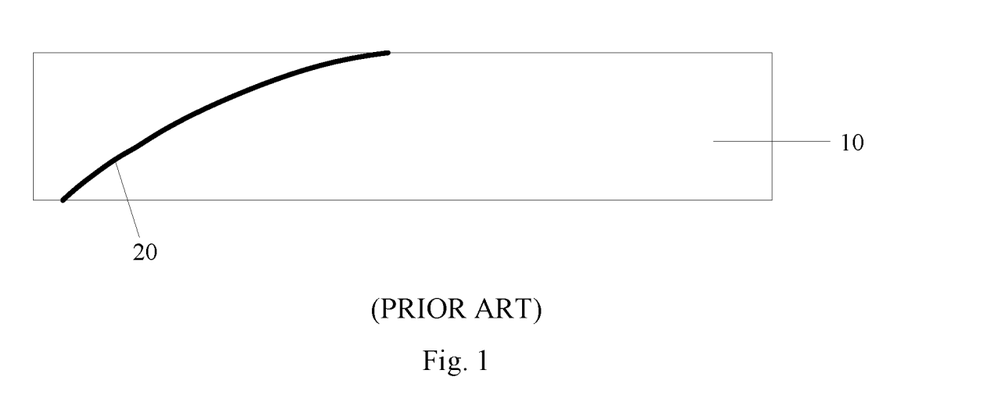
FIG. 1 is a schematic view of an optical structure in which an optical waveguide and a free curved surface are combined with each other comprised in AR glasses.

In order to achieve augmented reality display, augmented reality devices such as AR glasses comprise off-axis optics, prisms, free curved surfaces optical waveguides, etc. The optical solution of combination of an optical waveguide and s free curved surface results in a relatively large field of view. An example of an optical structure where a prior art optical waveguide and a free curved surface are combined is shown in FIG. 1. A free curved surface 20 is added at the end of a medium layer 10 of the optical waveguide. The semi-transmissive, semi-reflective imaging is performed using a free curved surface 20, and the displayed image is enlarged by the free curved surface 20, so as to enable human eyes to see an enlarged virtual image. However, as shown in FIG. 1, because the structure of the free curved surface 20 has to be considered, the thickness of the medium layer 10 of the optical waveguide is required to be relatively large, thereby resulting in a relatively large thickness of the optical waveguide. The increase of the thickness of the optical waveguide results in an increase of the weight of the augmented reality device (such as the AR glasses), which highly discounts carrying and aesthetic feelings, thereby reducing the user's satisfaction.

Figure 2:
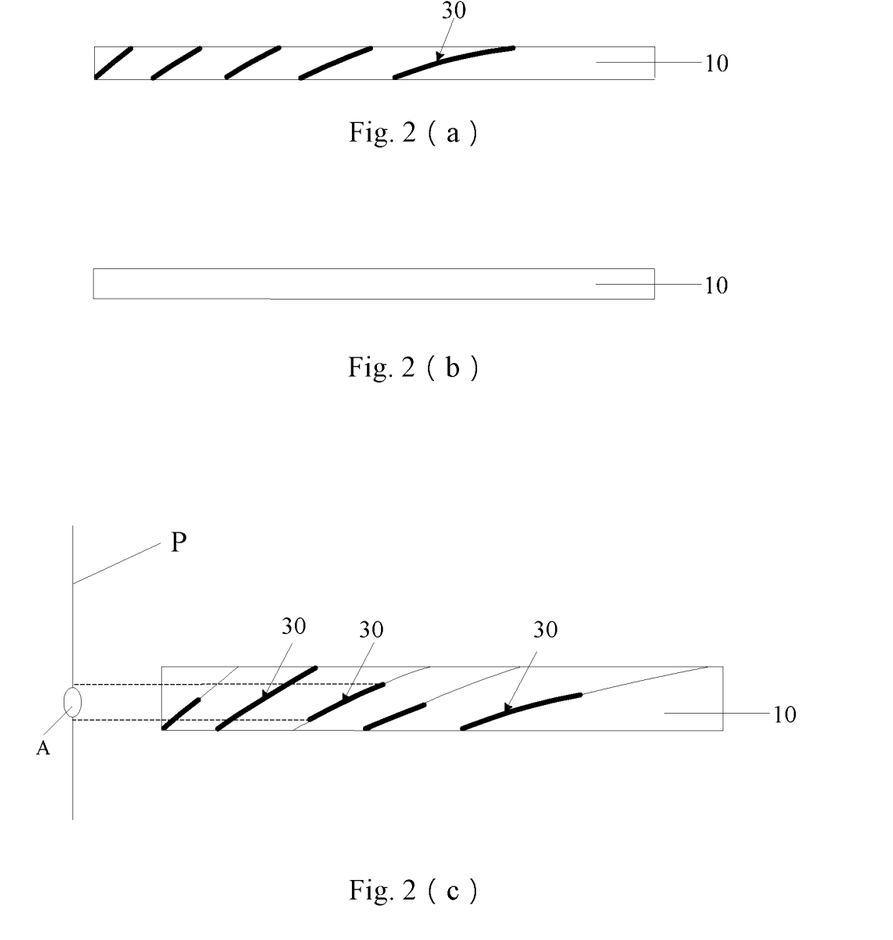
Figure 3:
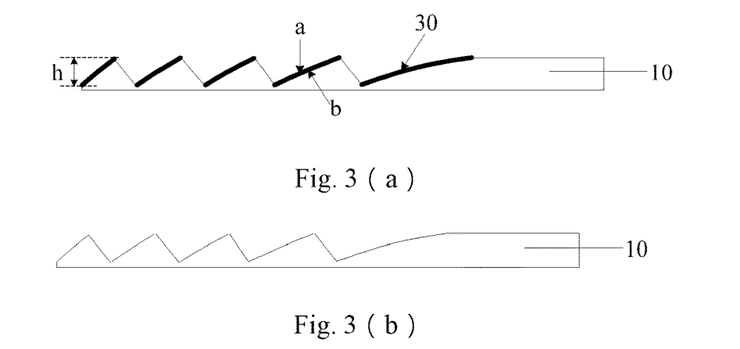
Figure 4:
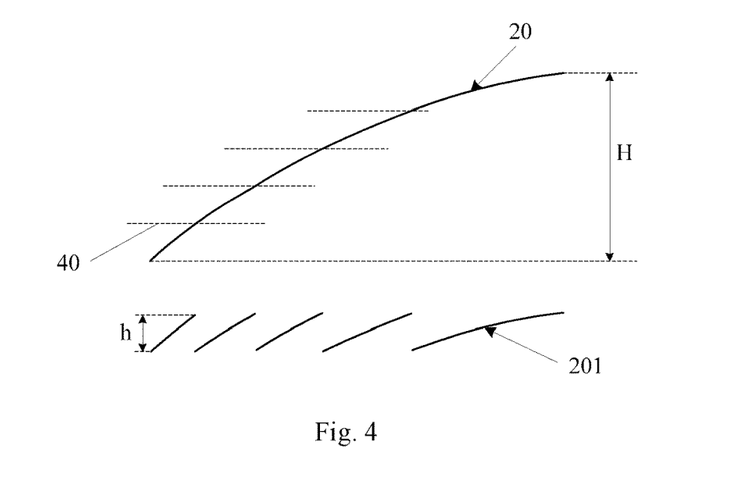
FIG. 4 is a view for illustrating the process of segmenting a curved surface to obtain a plurality of sub-curved surfaces.

An embodiment of this disclosure provides an optical waveguide, as shown in FIG. 2($a$) to FIG. 4, the optical waveguide comprises a medium layer 10 and N semi-transmissive, semi-reflective films 30 supported by the medium layer 10. The N semi-transmissive, semi-reflective films 30 are arranged in sequence along a first direction. The first direction is perpendicular to the thickness direction of the medium layer 10. The orthographic projections of every two adjacent semi-transmissive, semi-reflective films on a plane parallel to the thickness direction overlap as shown in FIG. 2($a$), 2($c$) or 3($a$). In the example of FIG. 2($c$), the plane parallel to the thickness direction is represented as P, the orthographic projections of two intermediate semi-transmissive, semi-reflective films 30 on the plane P has an overlap portion A. The contour of each semi-transmissive, semi-reflective film 30 is a curved surface structure. The curved surface structures of the N semi-transmissive, semi-reflective films 30 arranged in sequence are N continuous sub-curved surfaces formed by segmenting a larger curved surface. The sum of the heights of the N sub-curved surfaces is the height of the larger curved surface, and concave sides of the curved surface structures of the semi-transmissive, semi-reflective films face towards a same bottom surface of the medium layer. The above parameter N is a positive integer, greater than or equal to two. For example, as shown in FIG. 4, the curved surface 20 can be divided into N continuous sub-curved surfaces 201. The sum of the individual heights h of the sub-curved surfaces 201 is the height H of the larger curved surface 20.

In the optical waveguide as shown in FIG. 1, the semi-transmissive, semi-reflective film is designed to be in a curved surface shape on the whole, so as to reflect the light emitted by an image display apparatus to human eyes by means of different bending degrees at different positions of the curved surface 20. The design principle of the N semi-transmissive, semi-reflective films 30 with the curved surface structure in the embodiment of the disclosure can be explained by making reference to FIG. 4. Referring to FIG. 4, the optimally designed free curved surface 20 for example can be segmented by N−1 segment lines 40 as shown in FIG. 4, then the N sub-curved surfaces 201 obtained by segmentation are sequentially arranged, the N sequentially arranged sub-curved surfaces can form the free curved surface 20 after splicing with one another. Because each of the N sub-curved surfaces 201 comes from a portion of the curved surface 20, the bending degrees of the N sub-curved surfaces 201 are the same as those of the curved surface 20. Thus, the N sub-curved surfaces 201 can perform the same function as the curved surface 20 without the same overall thickness, i.e., the N semi-transmissive, semi-reflective films 30 in the embodiment of this disclosure and the whole semi-transmissive, semi-reflective film as shown in FIG. 1 can function the same but with different thicknesses. In addition, the surface contour of the free curved surface 20 is related to actual applications of the optical waveguide, the design of the free curved surface 20 is well known by the person skilled in the art. A free curved surface may have different curvatures, which is advantageous to eliminating spherical aberration. Therefore, the curved surface 20 is a free curved surface.

In an embodiment of the disclosure, the material of the medium layer 10 is a transparent material, for example, glass. The shape of the medium layer 10 is not limited herein, as long as it can bear a plurality of semi-transmissive, semi-reflective films 30. Exemplarily, the shape of the medium layer 10 can be as shown in FIG. 2(b), the medium layer 10 has a rectangle shape. The semi-transmissive, semi-reflective film 30 can be sandwiched in the rectangle in this case. Alternatively, the shape of the medium layer 10 can be as shown in FIG. 3(b), the medium layer 10 comprises a plurality of convex surfaces for supporting the semi-transmissive, semi-reflective films 30.

Figure 5:
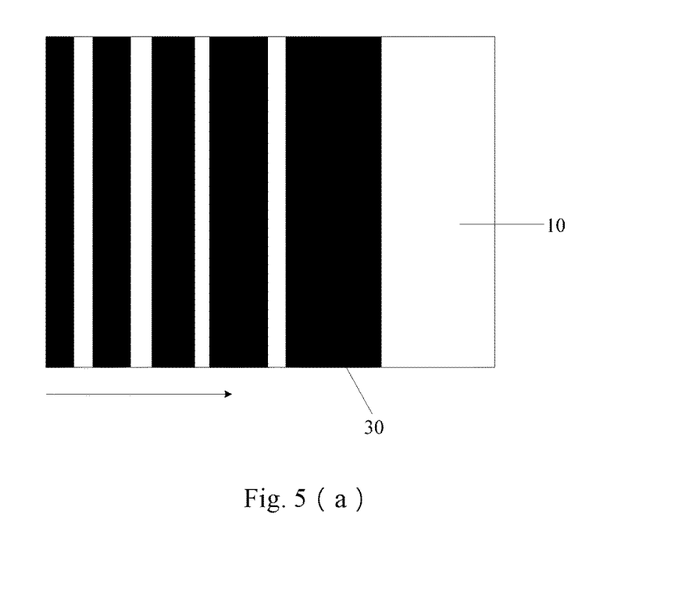

Each semi-transmissive, semi-reflective film 30 can be substantially in a straight strip shape, or can be in a bended strip shape. FIG. 5(a) and FIG. 5(b) show schematic top view of the semi-transmissive, semi-reflective film 30 in straight strip and bended strip shapes, respectively. In case the semi-transmissive, semi-reflective film 30 is in a straight strip shape, the medium layer 10 for supporting the semi-transmissive, semi-reflective film 30 comprises a straight strip-shaped surface.

Herein, as the semi-transmissive, semi-reflective film 30 is a curved surface structure, the semi-transmissive, semi-reflective film 30 has a certain height, as shown in FIG. 3(a), the height h of the semi-transmissive, semi-reflective film 30 is the vertical distance between the upper edge and the lower edge of the semi-transmissive, semi-reflective film 30. The heights h of the N semi-transmissive, semi-reflective films 30 can be the same, as shown in FIG. 2(a) and FIG. 3(a), and can also be different as shown in FIG. 2(c). In addition, the lower edges of the N semi-transmissive, semi-reflective films 30 can be located in the same plane as shown in FIG. 2(a), alternatively, they may be located in different planes as shown in FIG. 2(c). The N semi-transmissive, semi-reflective films 30 are arranged in sequence along a first direction perpendicular to the thickness direction of the medium layer, by way of example, the arrow direction indicated in FIG. 5(a) and FIG. 5(b) is the first direction.

In an embodiment, a plurality of semi-transmissive, semi-reflective films 30 being arranged in sequence along the first direction means that the upper edges or the lower edges of the plurality of semi-transmissive, semi-reflective films 30 are arranged in sequence along the first direction, referring to FIGS. 2(a), 2(c) and 3(a), the lower edges of the plurality of semi-transmissive, semi-reflective films 30 are arranged in sequence along the first direction.

Further, the orthographic projections of adjacent semi-transmissive, semi-reflective films 30 on a plane parallel to the thickness direction of the medium layer 10 have an overlap region. For example, as shown in FIG. 2(a), the orthographic projections of adjacent semi-transmissive, semi-reflective films 30 on a plane parallel to the thickness direction of the medium layer 10 completely overlap, i.e., in this example, the heights of the semi-transmissive, semi-reflective films 30 are same, and the upper edges of the semi-transmissive, semi-reflective films 30 are in the same plane perpendicular to the thickness direction of the medium layer 10, and the lower edges are located in the same plane perpendicular to the thickness direction of the medium layer 10. In another embodiment, as shown in FIG. 2(c), the orthographic projections of adjacent semi-transmissive, semi-reflective films 30 on a plane parallel to the thickness direction of the medium layer 10 partially overlap, the overlapping region is shown by the ellipse A shown in FIG. 2(c).

In the embodiment as shown in FIG. 3(a), a indicates the convex side of the semi-transmissive, semi-reflective film 30, b represents the concave side of the semi-transmissive, semi-reflective film 30. The surface of the medium layer 10 parallel to the thickness direction is the side surface thereof, and the surface perpendicular to the thickness direction is the bottom surface thereof. The medium layer 10 may, as shown in FIG. 2(b), comprise two bottom surfaces, which are upper bottom surface and lower bottom surface respectively. The concave sides of the semi-transmissive, semi-reflective films 30 may all face towards the upper bottom surface, or all face towards the lower bottom surface. In another embodiment, the medium layer 10 may comprise only one bottom surface as shown in FIG. 3(b), the concave sides of each semi-transmissive, semi-reflective films 30 face towards this bottom surface.

The semi-transmissive, semi-reflective film 30 can be formed on the medium layer 10 by film plating, and can also be formed on the medium layer 10 by spraying or other ways, which will not be limited herein. The material and the thickness of the semi-transmissive, semi-reflective film 30 can be selected based on the light reflectivity of the optical waveguide. In an embodiment, each semi-transmissive, semi-reflective film 30 has a uniform thickness so as to realize luminance uniformity of light reflected by the optical waveguide.

The spacing between the plurality of semi-transmissive, semi-reflective films 30 in the optical waveguide is not limited herein, and can be set as need.

An embodiment of the disclosure provides an optical waveguide, the optical waveguide comprises a medium layer 10 and a plurality of semi-transmissive, semi-reflective films 30 supported by the medium layer 10. Relative to the example of forming the semi-transmissive, semi-reflective films 30 as a whole curved surface 20 shown in FIG. 1, each semi-transmissive, semi-reflective film 30 in the optical waveguide put forth in the embodiment of the disclosure is a sub-curved surface 201, the surface contour of each semi-transmissive, semi-reflective film 30 (i.e., each sub-curved surface 201) can be a portion of the curved surface 20, and the N semi-transmissive, semi-reflective films 30 can be arranged in sequence along the first direction. Since the sum of the heights of the sub-curved surfaces 201 is the height of the larger, curved surface 20, each of the heights of the N semi-transmissive, semi-reflective films 30 in this embodiment is smaller than the overall height of the semi-transmissive, semi-reflective film shown in FIG. 1. As the thickness of the optical waveguide depends on the height of the semi-transmissive, semi-reflective film, compared to the example of FIG. 1, the thickness of the optical waveguide in the embodiment of this disclosure is reduced, so as to make the optical waveguide thinner. The optical waveguide in this embodiment can perform essentially the same as the waveguide in FIG. 1, and the imaging effect and quality of the optical waveguide is not diminished. In addition, the decrease of the thickness of the optical waveguide reduces the weight of the optical waveguide, which is convenient for carrying and further improves aesthetics of the optical waveguide.

In an embodiment, as shown in FIG. 2(a) and FIG. 3(a), the heights of the plurality of semi-transmissive, semi-reflective films 30 are equal, and the lower edges of the plurality of semi-transmissive, semi-reflective films 30 are located in a same plane. As shown in FIG. 4, the curved surface 20 can be segmented by equal height to obtain sub-curved surfaces 201 with the same height, i.e., the heights of the plurality of semi-transmissive, semi-reflective films 30 are equal. In case the curved surface 20 is segmented by equal height, the larger the parameter N is, the smaller the height of each sub-curved surface 201 will be, i.e., the smaller the thickness of the optical waveguide will be.

If the heights of the plurality of semi-transmissive, semi-reflective films 30 are equal, and the lower edges of the plurality of semi-transmissive, semi-reflective films 30 are located in the same plane, the upper edges of the plurality of semi-transmissive, semi-reflective films 30 will also be located in the same plane. In this way, the thickness of the optical waveguide can be further reduced.

Figure 6:
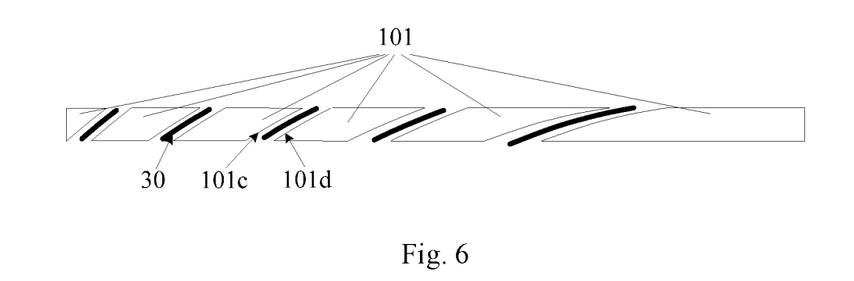
FIG. 6 is a schematic view of an optical waveguide comprising a plurality of sub-medium layers provided by another embodiment of this disclosure.

In an embodiment, as shown in FIG. 6, the medium layer 10 comprises a plurality of strip-shaped sub-medium layers 101. The plurality of sub-medium layers 101 are spliced in sequence along the width direction of the medium to form the medium layer 10. For two splicing surfaces of two adjacent sub-medium-layers 101 to be mutually spliced, one must be a concave surface 101c, and the other a convex surface 101d. Each semi-transmissive, semi-reflective film 30 can be sandwiched between two splicing surfaces to be mutually spliced. The two splicing surfaces are fitted with the semi-transmissive, semi-reflective film 30.

That splicing surfaces mutually spliced are fitted with a semi-transmissive, semi-reflective film 30 means that the semi-transmissive, semi-reflective film 30 is in close contact with both of the mutually spliced splicing surfaces of two adjacent sub-medium layers 101. In an embodiment, the two mutually spliced splicing surfaces and the semi-transmissive, semi-reflective film 30 can be fixed together by optically transparent adhesive.

As sub-medium layers 101 are configured to bear a semi-transmissive, semi-reflective film 30, if the semi-transmissive, semi-reflective film 30 is in a straight strip shape, the sub-medium layers 101 are in a straight strip shape. When the semi-transmissive, semi-reflective film 30 is in a bended strip shape, the sub-medium layer 101 is in a bended strip shape. In an embodiment, the number of the sub-medium layers 101 is one more than the number of the semi-transmissive, semi-reflective films 30. Alternatively, the difference between the number of the sub-medium layers 101 and the number of the semi-transmissive, semi-reflective films 30 is greater than or equal to 2.

In addition, the thicknesses of the plurality of sub-medium layers 101 can be either same or different, which is not limited herein, however, it be at least be ensured that the thickness of at least one-sub-medium layer 101 in two adjacent sub-medium layers 101 is greater than or equal to the height of the semi-transmissive, semi-reflective film 30 sandwiched between the two adjacent sub-medium layers 101.

In case the medium layer 10 comprises a plurality of strip-shaped sub-medium layers 101, in the manufacturing process of the optical waveguide, the semi-transmissive, semi-reflective film 30 can be either formed on the concave surface 101c or the convex surface 101d of two mutually spliced splicing surfaces, certainly, it can also be formed on both of the concave surface 101c and the convex surface 101d.

In an embodiment of this disclosure, the medium layer 10 comprises a plurality of sub-medium layers 101, and each semi-transmissive, semi-reflective film 30 is sandwiched between two adjacent sub-medium layers 101, in this way, the semi-transmissive, semi-reflective film 30 can be protected.

Further, as shown in FIG. 6, in an embodiment, the heights of the plurality of semi-transmissive, semi-reflective films 30 are equal, the thicknesses of the plurality of sub-medium layers 101 are equal, and the thickness of the sub-medium layer 101 is equal to the height of the semi-transmissive, semi-reflective film 30.

For this embodiment, because the heights of the plurality of semi-transmissive, semi-reflective films 30 are equal, the thicknesses of the plurality of sub-medium layers 101 are equal, and the thickness of the sub-medium layer 101 and the height of the semi-transmissive, semi-reflective film 30 are equal, and the lower edges of the semi-transmissive, semi-reflective films 30 and the bottom surface of the sub-medium layer 101 can be arranged in a same plane, the upper edges of the semi-transmissive, semi-reflective films 30 and the upper edges of the sub-medium layer 101 can be arranged in the same plane, so as to further reduce the thickness of the optical waveguide formed.

Figure 7:
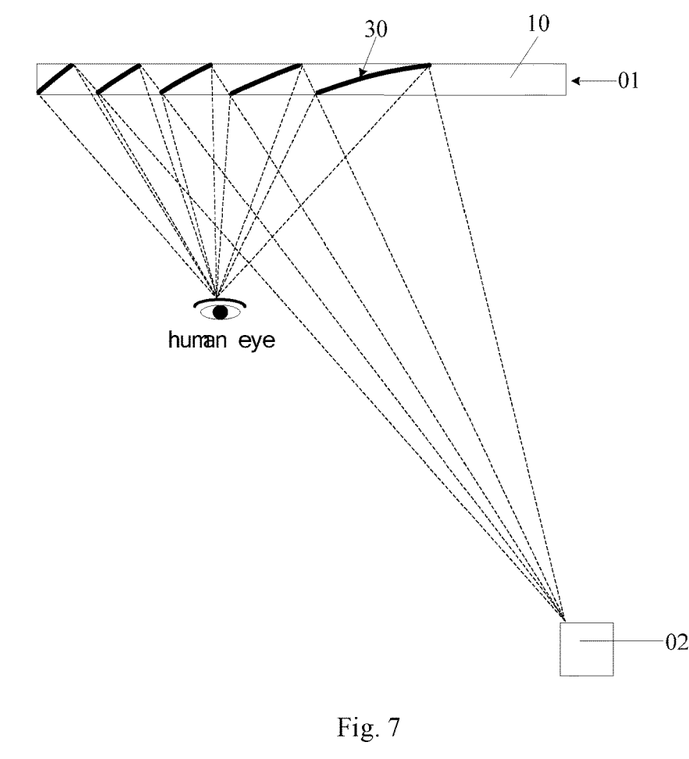
FIG. 7 is a schematic view of an augmented reality device provided by an embodiment of this disclosure.
Figure 8:
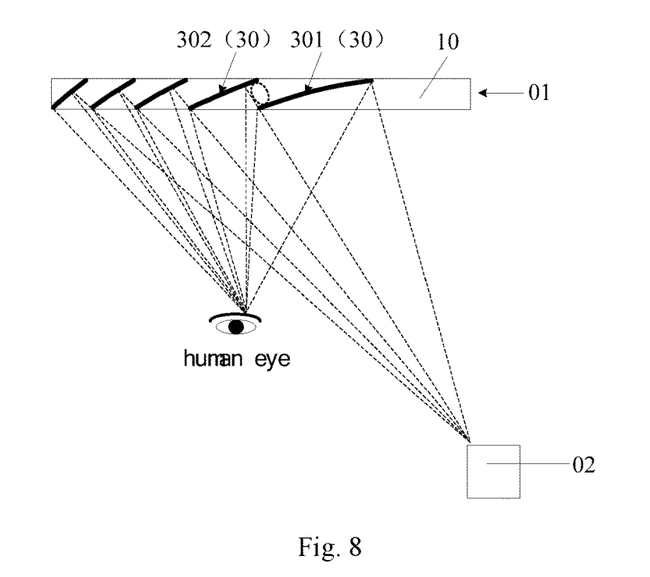
FIG. 8 is a schematic view of an augmented reality device provided by another embodiment of this disclosure.
Figure 9:
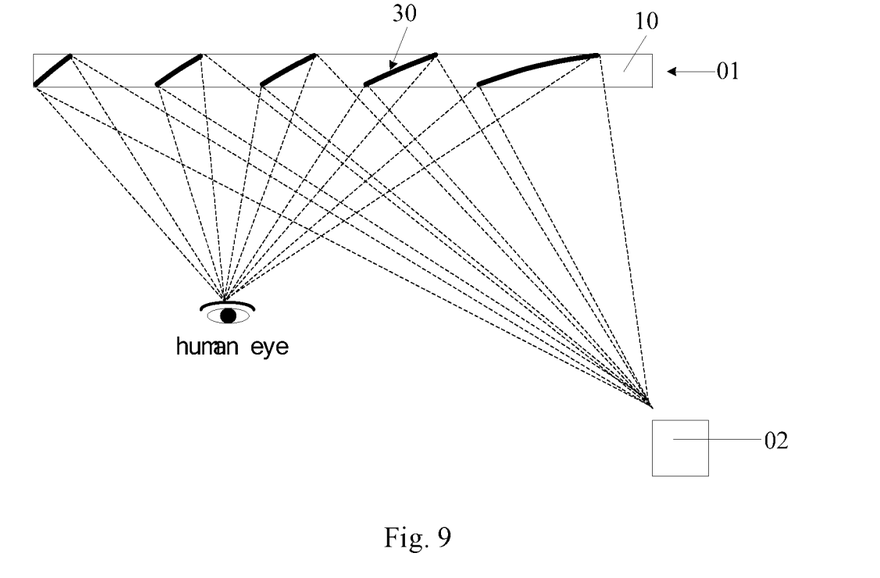
FIG. 9 is a schematic view of an augmented reality device provided by a further embodiment of this disclosure.

An embodiment of the disclosure provides an augmented reality device, as shown in FIG. 7, FIG. 8 or FIG. 9, that comprises the above optical waveguide 01 and an image display apparatus 02. The image display apparatus 02 is configured to project a displayed image onto the optical waveguide 01. The optical waveguide 01 is configured to reflect the light emitted by the image display apparatus 02 to the human eyes.

The augmented reality device can be a wearable device, specifically, for example, can be a wearable helmet or AR glasses.

In addition, the image display apparatus 02 can be a display device of any type, for example, it can be a liquid crystal display (LCD), and can also be an organic light emitting diode (OLED) display or a projection device.

The image display apparatus 02 can display a virtual image and reflect the displayed image to human eyes through the semi-transmissive, semi-reflective film 30. The ambient light can also reach the human eyes through the semi-transmissive, semi-reflective film 30. In this way, what the user sees through the semi-transmissive, semi-reflective film 30 is an integrated scene of the virtual image and the external real environment, so as to realize augmented reality display.

According to the example of FIG. 1, light from the image display apparatus reaches human eyes via at least one free curved surface (e.g., a curved semi-transmissive, semi-reflective film). Pursuant to the principles disclosed by the embodiments of FIG. 2(a) to FIG. 4 of this disclosure, any one or more free curved surfaces in the augmented reality device can be replaced with N semi-transmissive, semi-reflective films. For example, for an augmented reality device that comprises two free curved surfaces, one free curved surface in the augmented reality device can be arranged as N strip-shaped semi-transmissive, semi-reflective films according to the embodiments of this disclosure, or the two free curved surfaces in the augmented reality device can each be arranged as N strip-shaped semi-transmissive, semi-reflective films according to the embodiments of this disclosure.

The spacing between the N semi-transmissive, semi-reflective films 30 of the optical waveguide in the augmented reality device is not defined herein. It can be as shown in FIGS. 7 and 9, the orthographic projections of the N semi-transmissive, semi-reflective films 30 on the bottom surface of the medium layer 10 do not overlap with one another, moreover, the spacing between the semi-transmissive, semi-reflective films 30 in FIG. 9 is relatively large relative to FIG. 7, thus the length of the optical waveguide 01 will be larger. It can also be as shown in FIG. 8, the orthographic projections of two adjacent semi-transmissive, semi-reflective films in the N semi-transmissive, semi-reflective films 30 on the bottom surface of the medium layer 10 have an overlap portion.

An embodiment of this disclosure provides an augmented reality device. The augmented reality device comprises an optical waveguide 01 and an image display apparatus 02. The optical waveguide 01 comprises a medium layer 10 and N semi-transmissive, semi-reflective films 30 supported by the medium layer 10. As compared to the example of fabricating the semi-transmissive, semi-reflective films 30 as an entirety shown in FIG. 1, this embodiment comprises N semi-transmissive, semi-reflective films 30, each semi-transmissive, semi-reflective film 30 being a sub-curved surface 201. The surface contour of each semi-transmissive, semi-reflective film 30 (i.e., each sub-curved surface 201) is a portion of the curved surface 20, and the N semi-transmissive, semi-reflective films 30 are arranged in sequence along a first direction, the sum of the heights of the sub-curved surfaces 201 is the height of the curved surface 20, hence, each of the heights of the N semi-transmissive, semi-reflective films 30 in this embodiment is smaller than the overall height of the semi-transmissive, semi-reflective film 20 as shown in FIG. 1, whereas the thickness of the optical waveguide depends on the height of the semi-transmissive, semi-reflective film 30, hence, compared with the example of FIG. 1, the thickness of the optical waveguide in this embodiment is reduced, so as to make the optical waveguide thin. Meanwhile, it can function the same as the semi-transmissive, semi-reflective film as shown in FIG. 1, and the imaging effect and quality of the optical waveguide will not be diminished.

Generally, each reflecting surface in the optical waveguide of intelligent glasses is a plane, hence, the light from by the image display apparatus 02 will not be deflected. However, in the embodiment of the disclosure, each semi-transmissive, semi-reflective film 30 is a curved surface, in order to ensure that the light will not be deflected so as to influence or disturb the image information, it is desired that the reflected light of each semi-transmissive, semi-reflective film 30 will not be blocked by its adjacent semi-transmissive, semi-reflective film 30. Therefore, in some embodiments, as shown in FIGS. 7 and 9, the orthographic projections of the N semi-transmissive, semi-reflective films on the bottom surface of the medium layer do not overlap, an extension line of a connecting line of a luminous point of the image display apparatus and a lower edge of any semi-transmissive, semi-reflective film does not intersect with an adjacent semi-transmissive, semi-reflective film or exactly goes through an upper edge of the adjacent semi-transmissive, semi-reflective film. In this way, none of the semi-transmissive, semi-reflective films will be blocked by an adjacent semi-transmissive, semi-reflective film, so as to be capable of forming a continuous image.

In the example of FIG. 7, the augmented reality device can only comprise one free curved surface (N strip-shaped semi-transmissive, semi-reflective films 30 are equivalent to a free curved surface). The extension line of the connecting line of a luminous point of the image display apparatus 02 and a lower edge of any semi-transmissive, semi-reflective film 30 exactly goes through an upper edge of the adjacent semi-transmissive, semi-reflective film 30.

Herein, the edge of the semi-transmissive, semi-reflective film 30 close to the image display apparatus 02 is referred to as the lower edge, and the edge of the semi-transmissive, semi-reflective film 30 away from the image display apparatus 02 is called the upper edge. In this way, in this embodiment, the light emitted by the image display apparatus 02 irradiates onto the N semi-transmissive, semi-reflective films 30 arranged in sequence, and light reflected by the semi-transmissive, semi-reflective films 30 will not be blocked by the semi-transmissive, semi-reflective films, thereby avoiding occurrence of ghost images, so as to form a continuous image. Moreover, the length of the optical waveguide 01 can be made smallest, so as to further reduce the bulk of the optical waveguide 01.

In case the light reflected by the semi-transmissive, semi-reflective films 30 is blocked, referring to FIG. 8, the light emitted by the image display apparatus 02 is incident to the semi-transmissive, semi-reflective film 301, and is reflected by the semi-transmissive, semi-reflective film 301, if the semi-transmissive, semi-reflective film 30 is an ordinary semi-transmissive, semi-reflective film (the ordinary semi-transmissive, semi-reflective film refers to a semi-transmissive, semi-reflective film that can partially transmit and partially reflect any light), the semi-transmissive, semi-reflective film also allows partial light to be transmitted, whereas after reaching the semi-transmissive, semi-reflective film 302, the transmitted light will also be reflected by the semi-transmissive, semi-reflective film 302 (as shown by the broken circle in FIG. 8). If the augmented reality device only comprises one free curved surface (N strip-shaped semi-transmissive, semi-reflective films 30 are equivalent to a free curved surface), at this time, the extension line of the connecting line of a luminous point of the image display apparatus 02 and the lower edge of any semi-transmissive, semi-reflective film goes through portions of the semi-transmissive, semi-reflective film 30 except for the upper edge and the lower edge thereof. In this way, for the same light beam from the image display apparatus, it is not only reflected by the semi-transmissive, semi-reflective film 301 but also reflected by the adjacent semi-transmissive, semi-reflective film 302, resulting in confusion of the displayed image.

In view of this, according to an embodiment of this disclosure, as shown in FIG. 8, the light emitted from the image display apparatus 02 is polarized light, the semi-transmissive, semi-reflective film 30 is a polarization splitting dielectric film, and the polarization splitting dielectric film is configured to enable the polarized light impinging thereon to be totally reflected.

A polarization splitting dielectric film may only allow total reflection of polarized light with a particular polarization direction, hence, regarding polarized light in different polarization directions, different polarization splitting dielectric film can be provided, so as to enable total reflection of polarized light of different polarization directions.

Herein, as the polarization splitting dielectric film only allows total reflection of polarized light with a particular polarization direction, it will not influence normal entering of external ambient light.

The light emitted from the image display apparatus 02 in FIG. 8 is polarized light, hence, the image display apparatus 02 can be a liquid crystal display device, or, a polarizer can be added at the light exit surface of any other display devices to obtain polarized light. With the embodiment of this disclosure, when adjacent semi-transmissive, semi-reflective films 30 block each other to some extent, the light emitted by the image display apparatus 02 can be made to be polarized light. The semi-transmissive, semi-reflective films 30 are polarization splitting dielectric films. In this way, it can avoid that the light reflected by the semi-transmissive, semi-reflective films 30 overlap each other, which would affect the display effect.

Figure 10:
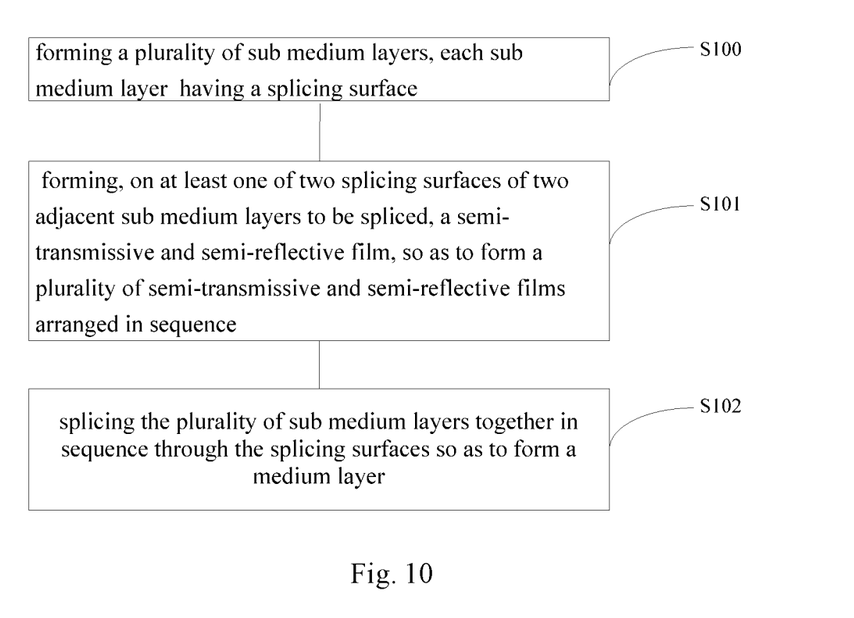
FIG. 10 is a flow diagram of a method for manufacturing an optical waveguide provided by an embodiment of this disclosure.

An embodiment of this disclosure further provides a method of manufacturing an optical waveguide, as shown in FIG. 10, the method comprises the following steps.

S100, forming a plurality of sub-medium layers 101, each sub-medium layer 101 having a splicing surface, the splicing surface being a concave surface or a convex surface. The thicknesses of the plurality of sub-medium layers 101 are not defined herein, and can be either same or different. In addition, the materials of the plurality of sub-medium layers 101 are all transparent materials, e.g., glass.

It should be noted that the surface contour of the splicing surface of the sub-medium layer 101 is designed according to the surface contour of the semi-transmissive, semi-reflective film 30.

S101, forming, on at least one of two splicing surfaces of any two sub-medium layers 101 to be spliced, a semi-transmissive, semi-reflective film 30 that covers the splicing surface, so as to form N semi-transmissive, semi-reflective films 30, wherein N is a positive integer, N≥2. Thus, each semi-transmissive, semi-reflective film is sandwiched between two splicing surfaces of two adjacent sub-medium layers respectively.

Herein, as the splicing surfaces of the sub-medium layer 101 are curved surfaces, when two adjacent sub-medium layers 101 are to be spliced with each other, one of two splicing surfaces to be mutually spliced is a convex surface, the other is a concave surface. On the basis of this, a semi-transmissive, semi-reflective film 30 can be formed on the convex surface in the two mutually spliced splicing surfaces, alternatively, the semi-transmissive, semi-reflective film 30 can be formed on the concave surface. Or, the semi-transmissive, semi-reflective film 30 is formed on both the convex surface and the concave surface, in this case, it is still considered that there is one semi-transmissive, semi-reflective film 30 between adjacent sub-medium layers 101. Because there is a plurality of sub-medium layers 101, N semi-transmissive, semi-reflective films 30 can be formed.

The semi-transmissive, semi-reflective film 30 can be formed on the sub-medium layer 101 by film plating, and can also be formed on the sub-medium layer 101 by spraying or other ways, which will not be limited herein. The material and the thickness of the semi-transmissive, semi-reflective film 30 can be set based on light reflectivity required by the optical waveguide. In an embodiment, the semi-transmissive, semi-reflective film 30 has a uniform thickness in order to realize luminance uniformity of light reflected by the optical waveguide.

S102, splicing the plurality of sub-medium layers 101 together in sequence (e.g., along the width direction of the sub-medium layers 101), so as to form a medium layer. The contour of each semi-transmissive, semi-reflective film is a curved surface structure, and the curved surface structures of the N semi-transmissive, semi-reflective films arranged in the medium layer in sequence are N continuous sub-curved surfaces formed by segmenting a same curved surface respectively, the sum of the heights of the sub-curved surfaces 201 is the height of the curved surface 20, and the concave sides of the semi-transmissive, semi-reflective films 30 face towards the same bottom surface of the medium layer 101.

When the plurality of sub-medium layers 101 are spliced together along the width direction of the sub-medium layers 101, because a semi-transmissive, semi-reflective film 30 is sandwiched between splicing surfaces of two adjacent sub-medium layers 101 that are mutually spliced, the N semi-transmissive, semi-reflective films 30 are arranged in sequence along the width direction of the sub-medium layers 101. On the basis of this, the two mutually spliced splicing surfaces are in close contact with the semi-transmissive, semi-reflective film 30.

Herein, the plurality of sub-medium layers 101 can be spliced together using the optical transparent adhesive.

According to an embodiment of this disclosure, the sub-medium layer 101 comprises an upper bottom surface and a lower bottom surface perpendicular to its thickness direction, the upper bottom surfaces of the plurality of sub-medium layers 101 are located in a same plane, and the lower bottom surfaces thereof are located in a same plane.

With the method of manufacturing an optical waveguide provided by the embodiment herein, the N semi-transmissive, semi-reflective films are distributed among the sub-medium layers 101 of the medium layer, each semi-transmissive, semi-reflective film 30 can constitute a sub-curved surface 201, the curved surface of each semi-transmissive, semi-reflective film 30 (i.e., each sub-curved surface 201) is a portion of the curved surface 20, and the sum of the heights of the sub-curved surfaces 201 is the height of the curved surface 20, hence, compared to the case of manufacturing the semi-transmissive, semi-reflective film into a whole curved surface as shown in FIG. 1, the thickness of the optical waveguide in the embodiment is reduced. Moreover, the imaging effect and quality of the optical waveguide will not be reduced. In addition, the decrease of the thickness of the optical waveguide makes the weight of the optical waveguide reduced, which is convenient for carrying and can improve aesthetics of the optical waveguide.

What are stated above are merely embodiments of this disclosure, however, the protection scope of the invention is not limited to these. Any modifications or replacements that can be easily conceived by the skilled person familiar with the technical field within the technical scope disclosed by this disclosure should be encompassed within the protection scope of the invention. Therefore, the scope of the invention should be subject to the protection scopes of the appending claims.

What is claimed is:

1. An optical waveguide, comprising a medium layer and N semi-transmissive, semi-reflective films supported by the medium layer,
   wherein the N semi-transmissive, semi-reflective films are arranged in sequence along a first direction perpendicular to a thickness direction of the medium layer, and
   wherein orthographic projections of every two adjacent semi-transmissive, semi-reflective films on a plane parallel to the thickness direction overlap in an overlap portion,
   wherein a contour of each of the semi-transmissive, semi-reflective films is a curved surface structure, and the semi-transmissive, semi-reflective films may be formed by creating N continuous sub-curved surfaces formed by segmenting a same curved surface,
   wherein a sum of the individual heights of the N sub-curved surfaces is a height of the larger curved surface, wherein a concave side of each of the semi-transmissive, semi-reflective films faces towards a same bottom surface of the medium layer, and wherein N is a positive integer greater than or equal to 2, wherein the medium layer comprises a plurality of strip-shaped sub-medium layers, wherein the plurality of sub-medium layers are spliced together in sequence along a width direction thereof, wherein, at two splicing surfaces of two adjacent sub-medium layers to be mutually spliced, one splicing surface is a concave surface, and the other is a convex surface, and wherein each semi-transmissive, semi-reflective film is sandwiched between two splicing surfaces of two adjacent sub-medium layers to be mutually spliced, and the two splicing surfaces are fitted with the semi-transmissive, semi-reflective film.

2. The optical waveguide according to claim 1, wherein the N semi-transmissive, semi-reflective films each have a same height, and wherein lower edges of the N semi-transmissive, semi-reflective films are located in a same plane.

3. An optical waveguide, comprising a medium layer and N semi-transmissive, semi-reflective films supported by the medium layer, wherein the N semi-transmissive, semi-reflective films are arranged in sequence along a first direction perpendicular to a thickness direction of the medium layer, and wherein orthographic projections of every two adjacent semi-transmissive, semi-reflective films on a plane parallel to the thickness direction overlap in an overlap portion, wherein a contour of each of the semi-transmissive, semi-reflective films is a curved surface structure, and the semi-transmissive, semi-reflective films may be formed by creating N continuous sub-curved surfaces formed by segmenting a same curved surface, wherein a sum of the individual heights of the N sub-curved surfaces is a height of the larger curved surface, wherein a concave side of each of the semi-transmissive, semi-reflective films faces towards a same bottom surface of the medium layer, and wherein N is a positive integer greater than or equal to 2, wherein the medium layer further comprises N bended sub-surfaces for supporting the N semi-transmissive, semi-reflective films respectively, and the N bended sub-surfaces are arranged along a length direction of the medium layer.

4. The optical waveguide according to claim 1, wherein the N semi-transmissive, semi-reflective films each have a same height, wherein the each of the plurality of sub-medium layers have a same thickness, and wherein the thickness of each sub-medium layer is equal to the height of each semi-transmissive, semi-reflective film.

5. The optical waveguide according to claim 1, wherein each of the semi-transmissive, semi-reflective films is substantially in a straight strip shape.

6. The optical waveguide according to claim 1, wherein the curved surface that can be segmented to obtain the N continuous sub-curved surfaces is a free curved surface.

7. An augmented reality device, comprising the optical waveguide according to claim 1 and an image display apparatus, wherein the image display apparatus is configured to project a displayed image onto the optical waveguide, and wherein the optical waveguide is configured to reflect light emitted from the image display apparatus to human eyes.

8. The augmented reality device according to claim 7, wherein orthographic projections of each of the N semi-transmissive, semi-reflective films on the bottom surface of the medium layer do not overlap, and wherein an extension line of a connecting line of a luminous point of the image display apparatus and a lower edge of any semi-transmissive, semi-reflective film either do not intersect with an adjacent semi-transmissive, semi-reflective film or go exactly through an upper edge of the adjacent semi-transmissive, semi-reflective film.

9. The augmented reality device according to claim 7, wherein orthographic projections of each of the N semi-transmissive, semi-reflective films on the bottom surface of the medium layer have an overlap region, wherein light emitted from the image display apparatus is polarized light, and wherein each of the semi-transmissive, semi-reflective films is a polarization splitting dielectric film, wherein the polarization splitting dielectric film is configured to enable the polarized light impinging thereon to be totally reflected.

10. The augmented reality device according to claim 9, wherein the image display apparatus is a liquid crystal display device.

11. A method for manufacturing an optical waveguide, comprising:

forming a plurality of sub-medium layers, each of the sub-medium layers having at least one splicing surface, each splicing surface being a concave surface or a convex surface, and splicing the plurality of sub-medium layers together via each splicing surface so as to form a medium layer, wherein the method further comprises:

prior to splicing the plurality of sub-medium layers together, forming, on at least one of two splicing surfaces of two adjacent sub-medium layers to be spliced in the plurality of sub-medium layers, a semi-transmissive, semi-reflective film that covers the splicing surface, so as to form a plurality of semi-transmissive, semi-reflective films arranged in sequence, each semi-transmissive, semi-reflective film being sandwiched between two splicing surfaces of two adjacent sub-medium layers, wherein a contour of each of the semi-transmissive, semi-reflective films follows a curved surface structure, and wherein if the semi-reflective films are arranged in sequence such that the contour of each is continuous with the next forming a continuous, larger curved surface, a sum of heights of the plurality of sub-curved surfaces is a height of the curved surface, and a concave side of the curved surface of each of the semi-transmissive, semi-reflective films faces towards a same bottom surface of the medium layer.

12. An augmented reality device, comprising the optical waveguide according to claim 3 and an image display apparatus, wherein the image display apparatus is configured to project a displayed image onto the optical waveguide, and wherein the optical waveguide is configured to reflect light emitted from the image display apparatus to human eyes.

* * * * *